US009935850B1

(12) United States Patent
Delaney et al.

(10) Patent No.: US 9,935,850 B1
(45) Date of Patent: Apr. 3, 2018

(54) SYSTEMS AND METHODS FOR IMPLEMENTING AN ON-DEMAND COMPUTING NETWORK ENVIRONMENT

(71) Applicant: Berryville Holdings, LLC, Berryville, VA (US)

(72) Inventors: Christopher Edward Delaney, Berryville, VA (US); Carl Bailey Jacobs, Manassas, VA (US); Chava Louis Jurado, Las Cruces, NM (US); Christopher Edward Jackson, Ashburn, VA (US)

(73) Assignee: Berryville Holdings, LLC, Herndon, VA (US)

( * ) Notice: Subject to any disclaimer, the term of this patent is extended or adjusted under 35 U.S.C. 154(b) by 129 days.

(21) Appl. No.: 14/937,978

(22) Filed: Nov. 11, 2015

Related U.S. Application Data

(60) Provisional application No. 62/081,047, filed on Nov. 18, 2014.

(51) Int. Cl.
| | |
|---|---|
| *G06F 15/177* | (2006.01) |
| *H04L 12/24* | (2006.01) |
| *H04L 12/46* | (2006.01) |
| *H04L 29/08* | (2006.01) |
| *H04W 88/02* | (2009.01) |

(52) U.S. Cl.
CPC ...... *H04L 41/5051* (2013.01); *H04L 12/4641* (2013.01); *H04L 41/0806* (2013.01); *H04L 67/2814* (2013.01); *H04W 88/02* (2013.01)

(58) Field of Classification Search
CPC ............. H04L 41/5051; H04L 41/0806; H04L 12/4641; H04L 67/2814; H04W 88/02
See application file for complete search history.

(56) References Cited

U.S. PATENT DOCUMENTS

| | | | | |
|---|---|---|---|---|
| 8,660,129 | B1* | 2/2014 | Brendel | H04L 12/4641 370/397 |
| 9,319,913 | B2* | 4/2016 | Raleigh | H04L 41/0893 |
| 9,450,817 | B1* | 9/2016 | Bahadur | H04L 45/64 |
| 9,507,630 | B2* | 11/2016 | Addepalli | G06F 9/461 |
| 2006/0184998 | A1* | 8/2006 | Smith | H04L 12/4679 726/3 |
| 2006/0190570 | A1* | 8/2006 | Booth, III | H04L 12/4641 709/220 |
| 2009/0276771 | A1* | 11/2009 | Nickolov | G06F 9/4856 717/177 |
| 2010/0142410 | A1* | 6/2010 | Huynh Van | H04L 12/4633 370/255 |
| 2010/0150120 | A1* | 6/2010 | Schlicht | H04W 4/20 370/338 |

(Continued)

*Primary Examiner* — Moustafa M Meky
*Assistant Examiner* — Blake Rubin
(74) *Attorney, Agent, or Firm* — Jones Day

(57) ABSTRACT

Systems and methods are provided for a computer-implemented method of implementing an on-demand computing network environment. A network specification is received from a user. Resources from one or more resource providers are provisioned. The on-demand computing network is configured, where configuring comprises assigning a first provisioned resource as a hub device and assigning one or more second provisioned resources as rim devices, where rim devices are configured to communicate with one another only via the hub device.

26 Claims, 17 Drawing Sheets

(56) References Cited

U.S. PATENT DOCUMENTS

| | | | | |
|---|---|---|---|---|
| 2010/0248719 | A1* | 9/2010 | Scholaert | H04M 1/725 455/434 |
| 2012/0005745 | A1* | 1/2012 | Wei | H04L 29/12594 726/15 |
| 2012/0078643 | A1* | 3/2012 | Nagpal | G06Q 30/02 705/1.1 |
| 2012/0084184 | A1* | 4/2012 | Raleigh | H04M 15/7652 705/30 |
| 2012/0155325 | A1* | 6/2012 | Eichen | H04L 12/4633 370/254 |
| 2012/0185925 | A1* | 7/2012 | Barkie | G06F 21/51 726/7 |
| 2012/0239792 | A1* | 9/2012 | Banerjee | H04L 67/1097 709/223 |
| 2013/0019089 | A1* | 1/2013 | Guidotti | G06F 9/5072 713/100 |
| 2013/0054962 | A1* | 2/2013 | Chawla | H04L 9/321 713/156 |
| 2013/0117459 | A1* | 5/2013 | Haynes | G06F 3/00 709/228 |
| 2013/0297933 | A1* | 11/2013 | Fiducia | H04L 63/0853 713/156 |
| 2013/0311778 | A1* | 11/2013 | Cherukuri | H04L 63/0272 713/171 |
| 2013/0332614 | A1* | 12/2013 | Brunk | H04L 67/1097 709/226 |
| 2013/0339949 | A1* | 12/2013 | Spiers | G06F 9/45558 718/1 |
| 2014/0032691 | A1* | 1/2014 | Barton | H04L 41/00 709/206 |
| 2014/0047434 | A1* | 2/2014 | Lam | G06F 8/61 717/177 |
| 2014/0109177 | A1* | 4/2014 | Barton | G06F 9/45533 726/1 |
| 2015/0052599 | A1* | 2/2015 | Champagne | H04L 63/0272 726/12 |
| 2015/0113123 | A1* | 4/2015 | Yeung | H04L 41/12 709/224 |
| 2015/0163206 | A1* | 6/2015 | McCarthy | G06F 21/6227 713/171 |
| 2015/0237114 | A1* | 8/2015 | McGrath | H04L 67/10 709/201 |
| 2015/0256984 | A1* | 9/2015 | Patel | H04W 4/10 455/416 |
| 2015/0263865 | A1* | 9/2015 | Rangarajan | H04L 12/4633 370/254 |
| 2015/0281181 | A1* | 10/2015 | Albisu | H04L 63/0272 726/7 |
| 2016/0044035 | A1* | 2/2016 | Huang | H04L 63/0272 726/4 |
| 2016/0094560 | A1* | 3/2016 | Stuntebeck | H04L 63/102 726/1 |
| 2016/0212012 | A1* | 7/2016 | Young | H04L 41/14 |
| 2016/0241623 | A1* | 8/2016 | Zoulias | H04L 65/1066 |
| 2017/0272554 | A1* | 9/2017 | Kwan | H04L 69/22 |

* cited by examiner

US 9,935,850 B1

SYSTEMS AND METHODS FOR IMPLEMENTING AN ON-DEMAND COMPUTING NETWORK ENVIRONMENT

CROSS REFERENCE TO RELATED APPLICATIONS

This application claims priority to U.S. Provisional Application No. 62/081,047, filed Nov. 18, 2014, entitled "Systems and Methods for Implementing an On-Demand Computing Network Environment," the entirety of which is herein incorporated by reference.

FIELD

This disclosure is related generally to computer networking and more particularly to implementation of an on-demand computing network environment.

BACKGROUND

A computing network typically includes a plurality of computing devices that are connected with one another, either physically or wirelessly, such that those computing devices can communicate with one another. A network is typically constructed by acquiring, either physically or via contractual agreement, the resources necessary to implement a desired framework. Typically, such components are acquired on a component by component basis.

SUMMARY

Systems and methods are provided for a computer-implemented method of implementing an on-demand computing network environment. A network specification is received from a user. Resources from one or more resource providers are provisioned. The on-demand computing network is configured, where configuring comprises assigning a first provisioned resource as a hub device and assigning one or more second provisioned resources as rim devices, where rim devices are configured to communicate with one another only via the hub device.

As another example, a computer-implemented system for implementing an on-demand computing network environment includes a provisioned resource data store configured to store records associated with resources provisioned from one or more resource providers, where records in the provisioned resources data store include an identification of a particular resource and a particular on-demand computing network to which the particular resource has been assigned. A network implementation engine is configured to receive a network specification from a user, assign a first provisioned resource as a hub device to the particular on-demand computing network and to update the provisioned resource data store, and assign one or more second provisioned resources as rim devices to the particular on-demand computing network and to update the provisioned resource data store, wherein rim devices are configured to communicate with one another only via the hub device.

DETAILED DESCRIPTION

Figure 1:
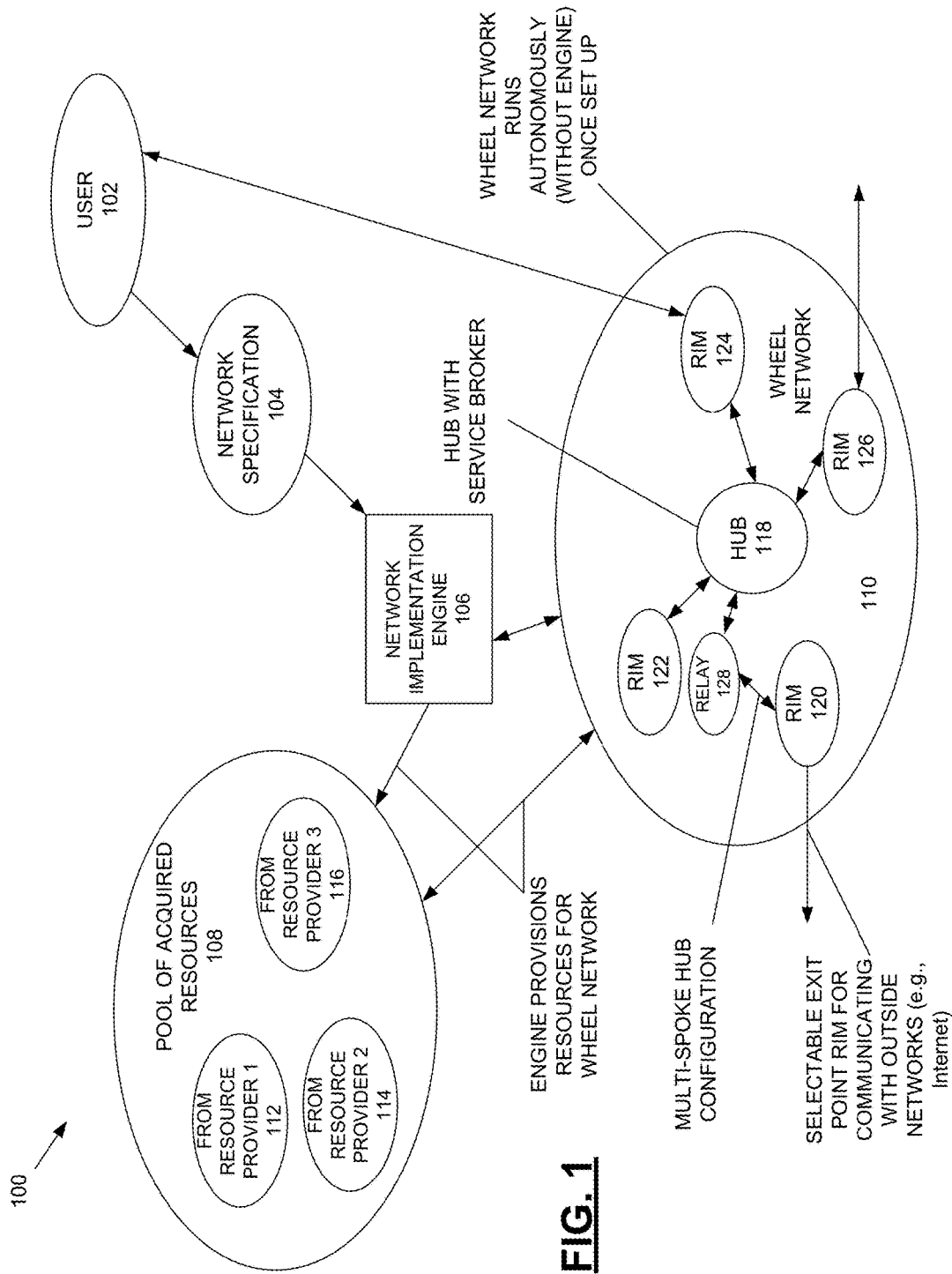
FIG. 1 is a block diagram depicting a computer-implemented environment for implementing an on-demand computing network.

FIG. 1 is a block diagram depicting a computer-implemented environment for implementing an on-demand computing network. The environment 100 of FIG. 1 enables a user 102 to specify and acquire a network designed to the user's specification in real time. A user 102 transmits a network specification 104 that represents a desired network topology to a network implementation engine 106. The network implementation engine 106 interacts with a pool of acquired resources 108 to build a network 110 that corresponds with the desired network identified by the user in the network specification 104.

The network implementation engine 106 is configured to examine the network specification 104 and provision resources necessary to implement the user's desired network configuration. The pool of resources 108 may contain a variety of resources of different types, which may also come from different providers. For example, a first resource 112 may be a cloud processing resource ("third party compute service provider processing resource") acquired from a first provider who provides servers with processing capabilities available for accessing. A second resource 114 may be mail server or file server resource provided by the same provider or from a different provider. A third resource 116 may be a cellular communication resource from a third provider, where that cellular communication resource enables acquisition of voice or video conference data from a party via a device of that party's data communication capabilities. Other resources can include proxy server resources for forwarding traffic, media servers for providing media (e.g., video, audio, image), as well as others.

The network implementation engine 106 interacts with the pool of acquired resources 108 to provision resources needed to create the desired on-demand computing network 110. The network implementation engine 106 assigns the provisioned resources to the network and configures the network topology. In one implementation, the on-demand network 110 is configured as a wheel network having a hub device 118 (e.g., a server) and one or more rim devices 120, 122, 124, 126 that can take the form of servers of different types or other computing components. The rim devices communicate with one another, in one embodiment, only through the hub device 118, where communications between the hub device 118 and the rim devices can be via secure connections, such as a VPN connection. Certain of the rim devices (e.g., rim devices 120, 124, 126) can be configured as exit points that are permitted to communicate with computing resources outside of the on-demand network 110, such as to the Internet. These external communications can be via a variety of protocols, some of which may not be secure, such as Http, Ftp, cellular protocols, or otherwise. Rim device 124 is configured to provide a secure link from the user 102 to the hub device 118 and other resources of the network 110, such as via a VPN connection. Rim devices that are not identified as exit points are, in one embodiment, not permitted to communicate outside the network 110. Such rim devices (e.g., rim device 122) can be assigned other computing duties, such as providing a file server or a mail server.

In addition to direct connections between the hub 118 and rim devices, such connections can be implemented using a plurality of links ("joints") connected by joint relays. In the example of FIG. 1, the connection between the hub device 118 and rim device 120 includes two joints connected by a joint relay 128, which can be implemented using a proxy server configured to forward traffic. Utilization of a plurality of joints along a spoke from the hub device 118 to a rim device 120 provides an additional degree of anonymity, where rim device 120 can function without knowing a physical address of the hub device 118, knowing only to forward data to joint relay 128, and where hub device 118 can function without knowledge of a physical address of the rim device 120. In one embodiment, during network setup, the network implementation engine 106 configures the hub device 118 to communicate to rim device 120 via joint relay 128 without providing the physical address of rim device 120 to the hub device 118. The network implementation engine 106 similarly configures rim device 120 without informing rim device 120 of a physical address of the hub device 118.

Figure 2:
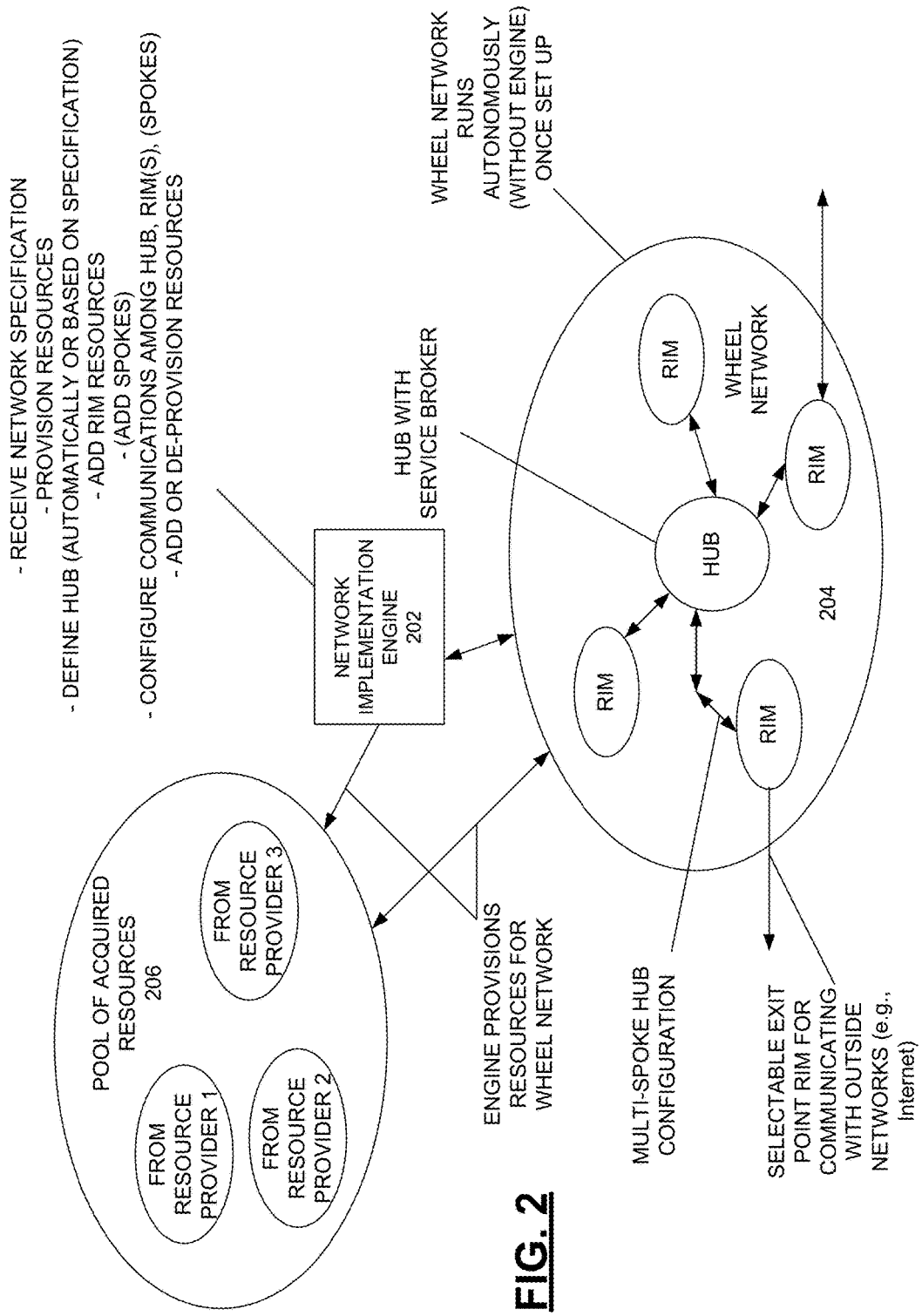
FIG. 2 is a diagram depicting a network implementation engine providing on-demand network setup and re-configuration operations.

FIG. 2 is a diagram depicting a network implementation engine providing on-demand network setup and re-configuration operations. The network implementation engine 202 builds the on-demand computing network 204 according to a user provided network specification. The network implementation engine 202 is also configured to add resources from a pool of acquired resources 206 to the network 204 and to de-provision resources when those resources are no longer needed. In one embodiment, only the network implementation engine 202 is permitted to add resources to or remove resources from the on-demand computing network 204.

To provision a resource to add it to the network 204, the network implementation engine 202 accesses the resource from the pool of acquired resources 206 if the needed resource is available. For example, the pool of acquired resources 206 may include a number of accounts with different third party computing service providers, online e-mail accounts, and file sharing accounts that the network implementation engine 202 can access and assign to the on-demand computing network to generate a desired user network topology. If a desired resource is not in the pool of acquired resources 206, then the network implementation engine 202 can acquire the desired resource or direct another entity to acquire the desire resource, with the resource then being assigned to the on-demand computing network 204. The network implementation engine 202 assigns the hub device 208, the rim devices 210, and communication links among them (e.g., identifying addresses with which the hub device 208 and rim devices 210 are configured to communicate with in the network 2014) to the network 204.

Following network 204 setup, in one embodiment, the network implementation engine 202 takes a hands off approach, where the network implementation engine 202 does not monitor or communicate with the network 204 while the network is in operation. In this configuration, the network implementation engine 202 receives no data about operations performed using the network 204 beyond knowledge of resources assigned to the network (e.g., as stored in records of a configuration data store). Upon receipt of a user request to add resources to the network 204 or remove resources therefrom, the network implementation engine 202 again interacts with the network 204 to implement the newly desired topology.

In one embodiment, de-provisioning of resources by the network implementation engine 202, such as at the end use of the network, is performed without direct communication with the network 204. To de-provision resources, the network implementation engine 202 communicates with providers of the resources, indicating to those providers that the resource is to be de-provisioned. The de-provisioned resource can then be recycled for use with another on-demand computing network, such as a network associated with a different user. In one embodiment, upon receipt of a de-provisioning request for a resource, a provider resets the resource (e.g., deletes stored data, such as e-mails or files) to an initial state so that it is ready for reuse. In this manner, the network implementation engine 202 acquires no further data associated with operation of the network 204.

Figure 3:
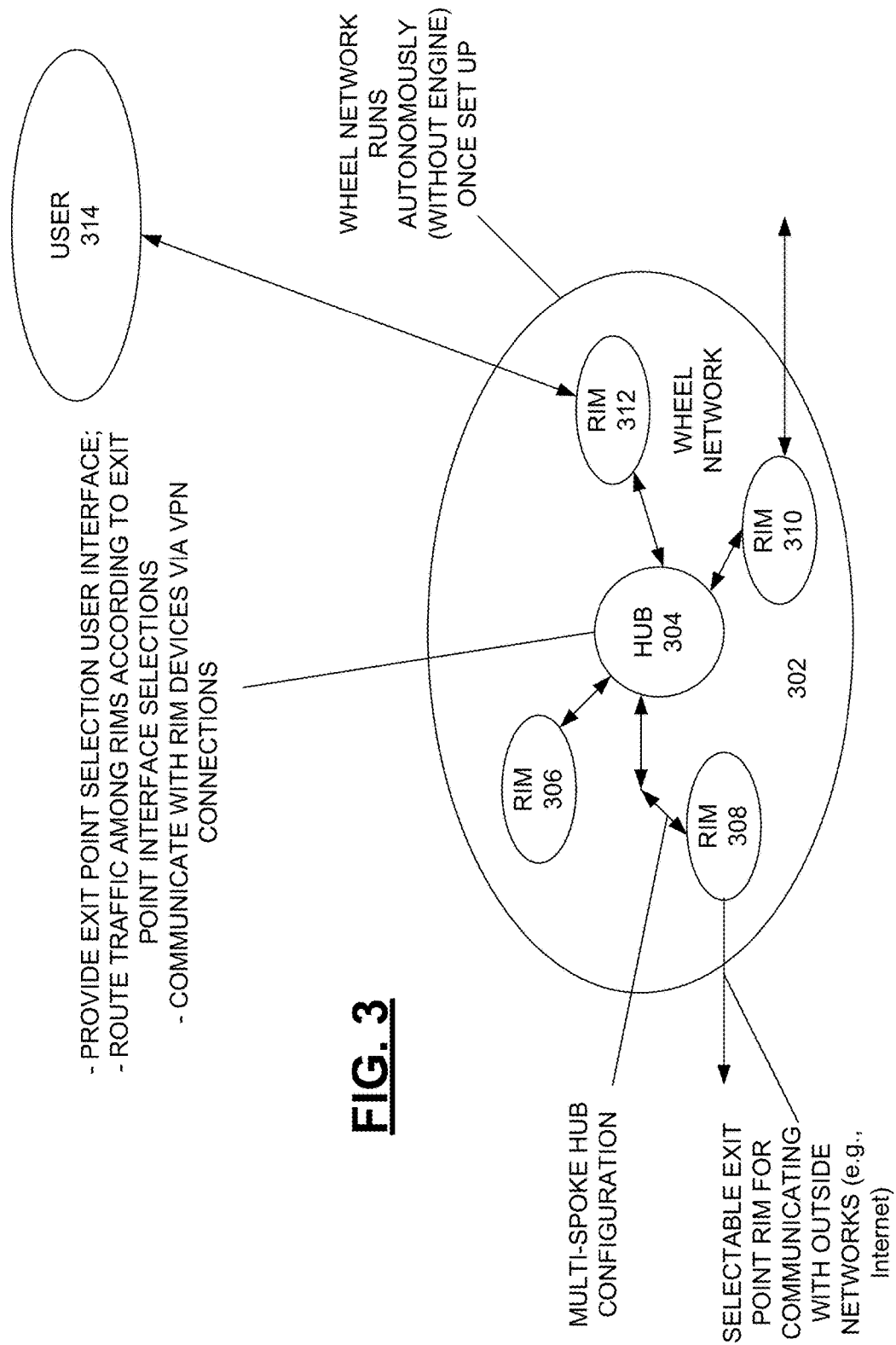
FIG. 3 is a diagram depicting an on-demand computing network in operation.

FIG. 3 is a diagram depicting an on-demand computing network in operation. Once the on-demand computing network 302 is implemented, the network 302 functions without communication with the network configuration engine. The on-demand computing network 302 includes a hub device 304 that communicates with a plurality of rim devices 306, 308, 310, 312. Rim device 312 provides a portal for a user 314 to communicate with resources within the network 302 and computing devices external to the network 302 through the network, as described further herein. Rim devices 308, 310 are designated as exit points through which the network 302 can communicate traffic out of the network 302. Rim device 306 provides a network service (e.g., a file server, a mail server) accessible to a user 314, other rim devices 308, 310, 312 within the network, and computing devices external to the network via rim devices (e.g., rim device 310) that are configured to receive traffic from outside of the network 302.

In one embodiment, routing of traffic through rim devices 308, 310 designated as exit points is user configurable during network 302 operation. The hub device 304 includes a service broker operating thereon. The service broker is configured to enable configuration changes to be made to resources currently assigned to the network 302. For example, the service broker is tasked with changing routing of traffic to and from the network 302 via rim devices 308, 310 designated for communications outside of the network, on command. In one embodiment, the service broker provides a user interface to a user 314 for designation of traffic routing. The user interface includes a listing of one or more types of traffic (e.g., e-mail, Http requests) that can be transmitted from the network 302 via one of the exit point rim devices 308, 310. The user interface further includes a listing of available exit point rim devices 308, 310. The user 314 selects a traffic type and an exit point 308, 310 with which to associate that type of traffic. That type of traffic is then directed out of the network 302 through that selected exit point 308, 310. Transitions between exit points for different types of traffic can be performed on user command without requiring a user to reconnect (e.g., via a VPN connection) to the network 302.

Such operation enables a disguising of a source of data to a party receiving traffic from the network. For example, if rim device 308 is positioned in Asia, while rim device 310 is positioned in South America, user selection of rim device 308 for Http traffic instead of rim device 310 will change an apparent source of the next Http request to be Asia instead of South America. Such operations can circumvent certain computing devices external to the network 302 from blocking communications with the network 302, where those external computing devices are configured to restrict communications based on the geographic location of incoming communications.

Figure 4:
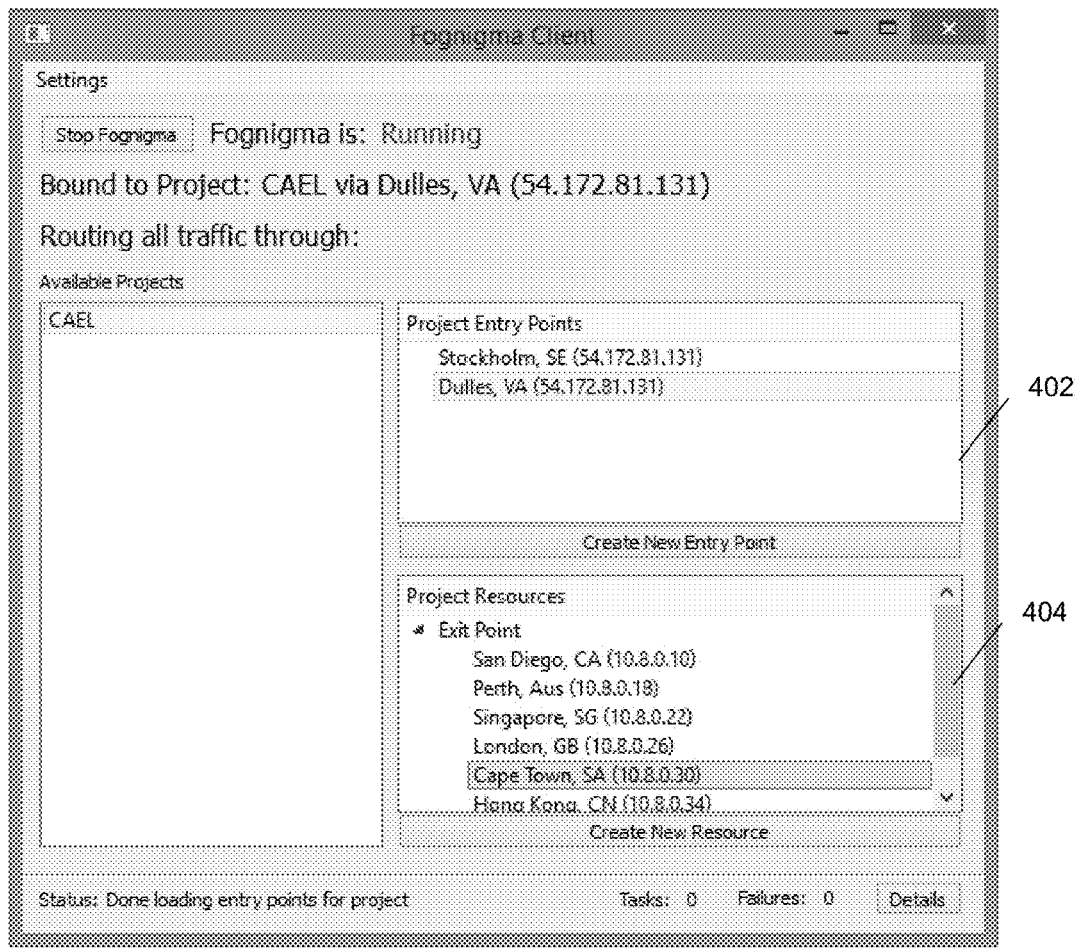
FIG. 4 is a diagram depicting an example user interface for selecting entry and exit points for an on-demand computing network.

FIG. 4 is a diagram depicting an example user interface for selecting entry and exit points for an on-demand computing network. A first portion 402 of the user interface identifies rim devices that configured to operate as entry points, where data can enter into the on-demand computing network. A second portion 404 identifies rim devices that are configured to operate as exit points, where data can be transmitted from the on-demand computing network. By toggling selection of the entry and exit points, traffic can be routed accordingly. For example, by selecting a first rim server in portion 404, traffic can be made to appear to be coming from San Diego. By changing that selection to a third entry in portion 404, that same traffic can be made to appear as originating from Singapore. It is noted that only logical address of the entry and exit points within the network are provided at 402, 404.

Figure 5:
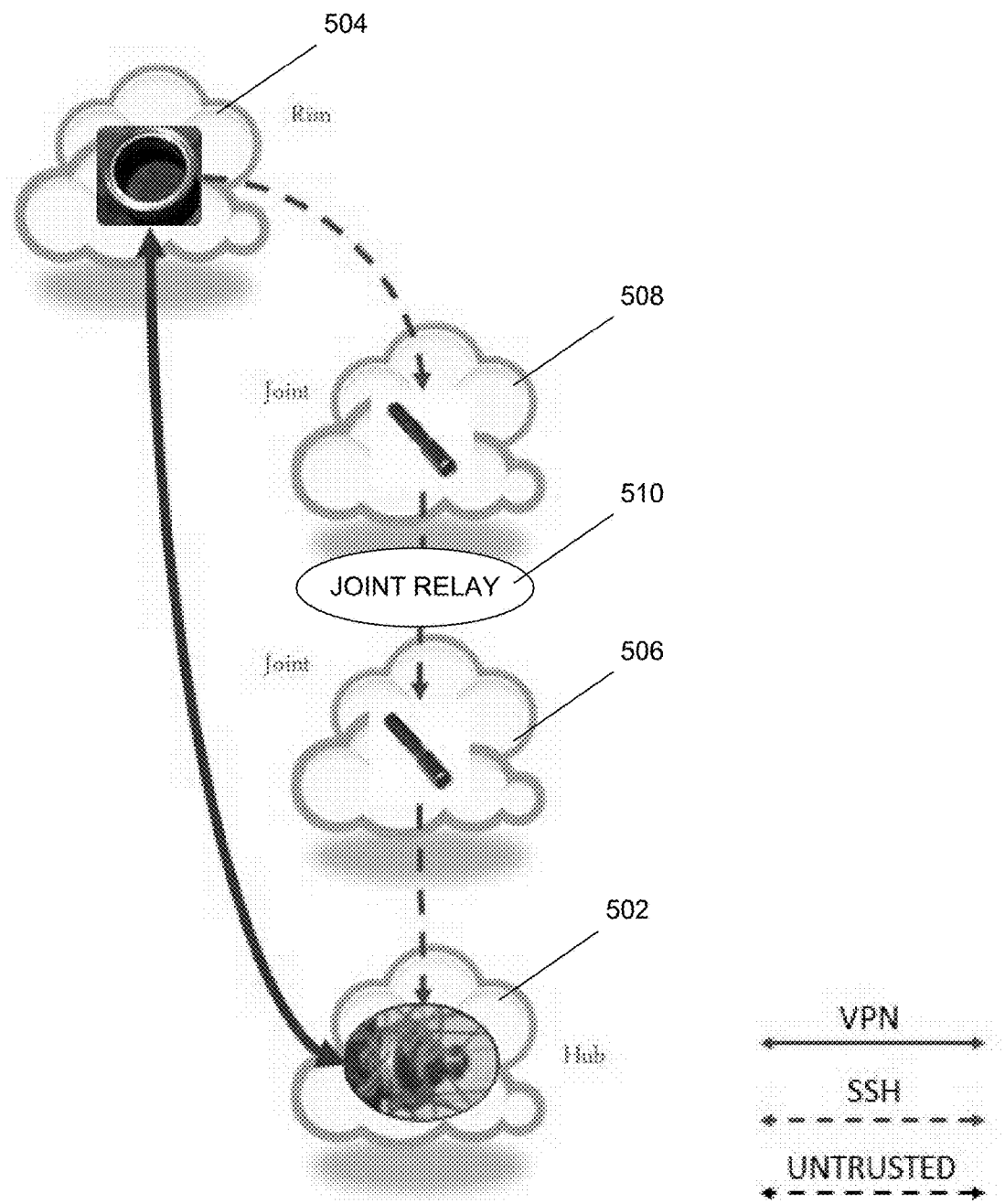
FIG. 5 is a diagram depicting an example configuration of a spoke from a hub device to a rim device.

FIG. 5 is a diagram depicting an example configuration of a spoke from a hub device to a rim device. A hub device 502 is configured to communicate with a rim device 504 via two joints 506, 508. The joints 506, 508 are connected via a joint relay device 510, which can take the form of a proxy server configured to forward received traffic. Communications along the joints 506, 508 via the joint relay 510 are performed using an SSH protocol, which enables secure communications between the hub device 502 and the rim device 504 via a VPN connection. In one embodiment, communications between the hub device 502 and the rim device 504 can be performed without either device 502, 504 knowing a physical address of the other. The hub device 502 need only have sufficient address information to communicate with the joint relay 510 via joint 506 for that traffic to reach rim device 504, with rim device 504 similarly only needing sufficient data to communicate with joint relay 510 via joint 508. Further anonymity can be achieved through insertion of additional joints and corresponding joint relays between the hub device 502 and the rim device 504.

Figure 6:
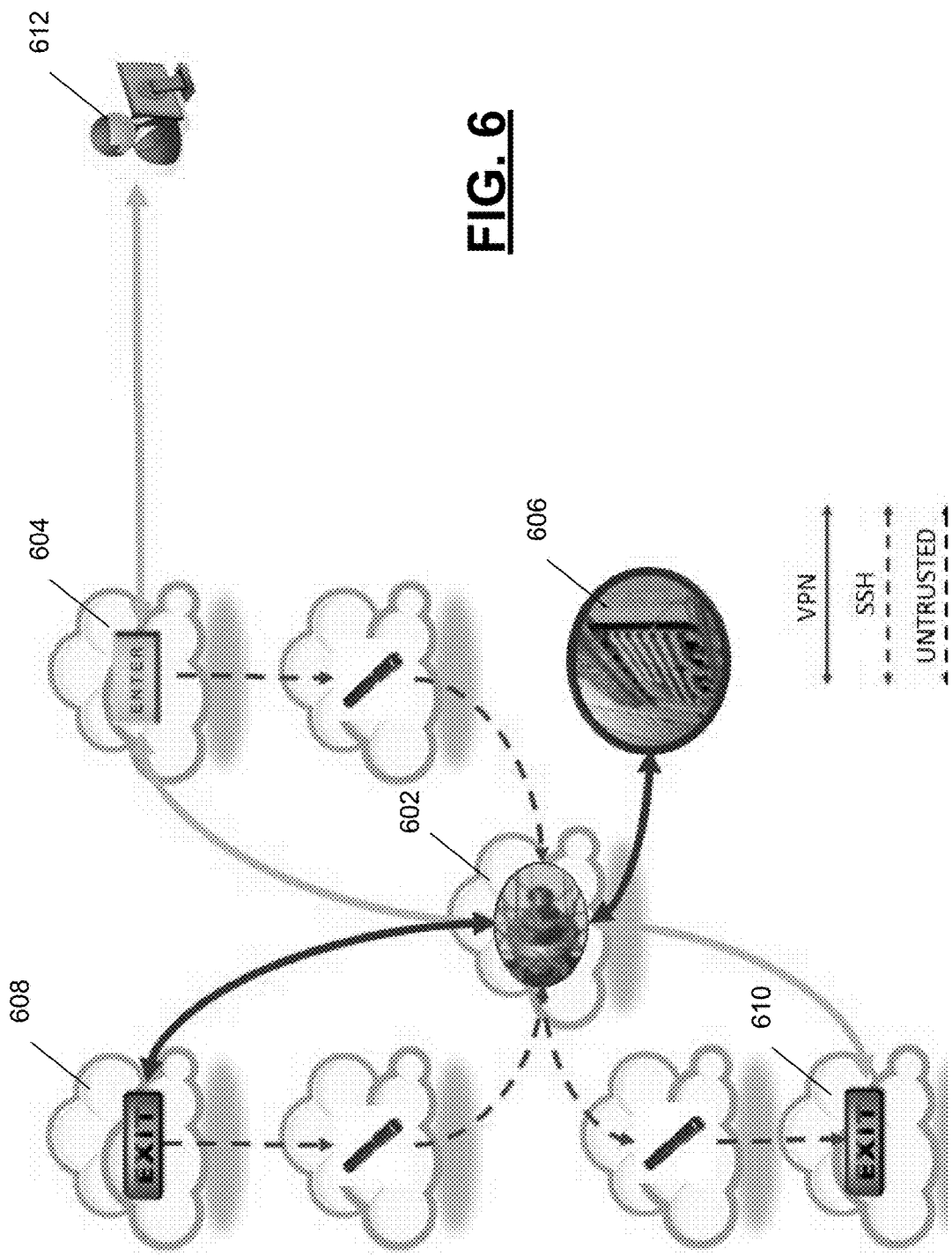
FIG. 6 is a diagram depicting an example on-demand computing network environment.

FIG. 6 is a diagram depicting an example on-demand computing network environment. A hub device 602 communicates with four rim devices 604, 606, 608, 610. Connections between three of the rim devices 604, 608, 610 include a plurality of joints. Joint communications can be via a SSH protocol, enabling VPN connectivity between rim devices 604, 606, 608, 610 and the hub device 602. A first rim device 604 operates as an entry point that facilitates communication between the on-demand computing network and a user 612. The user 612 can communicate with the network via rim device 604 to access services of the network, to configure components of the network (e.g., via a service broker operating on the hub device 602) and to communicate with computing devices outside of the network through the network, using exit point rim devices 608, 610. Rim device 606 provides a service to the network (e.g., an image sharing service) that can be accessed by the user 612, other rim devices 604, 608, 610, or devices external to the network. Two rim devices 608, 610 are designated as exit points, where the user can selectively transmit data to the outside of the network, where transmission from one exit point rim server 608 instead of another exit point rim server 610 can change an apparent originating source of the data transmission.

Figure 7:
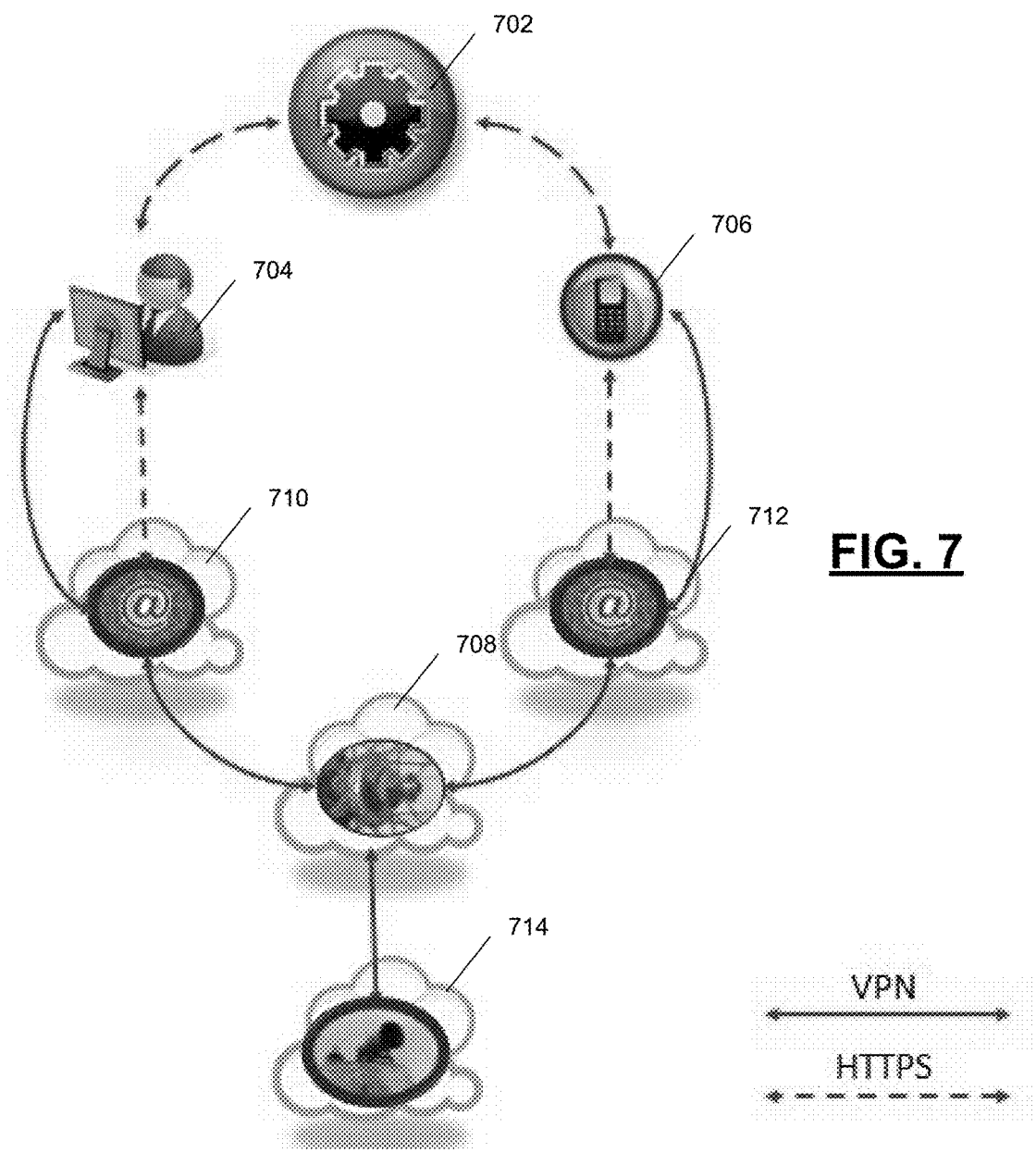
FIG. 7 is a diagram depicting an on-demand computing network configured for cellular communications.

FIG. 7 is a diagram depicting an on-demand computing network configured for cellular communications. A user interacts with a network implementation engine 702, such as via a desktop computer connection 704 or a cellular connection 706 to set up an on-demand network. The network implementation engine 702 provisions resources to implement the desired network that includes a hub device 708, a first rim computing device 710 designated for external data communications, a second rim device 712 designated for external cellular communications, and an third rim device 714 configured to provide a service for the network (e.g., a VOIP management service). Connection data can be provided to clients, such that a particular client only receives data associated with his connection to the network. For example, a desktop user 704 is provided address data for communicating with the first rim device 710, while a cellular user 706 is provided address data for communicating with the second rim device 712. In this manner, the clients 704 have no knowledge of other clients' physical addresses. Physical addresses of network devices are also limited, such that the first rim device 710 is unaware of a physical address of the second rim device 712.

Upon connection of the parties a telephone conversation or video conference can occur via the network. For example, the second rim device 712 is configured to communicate data with a cellular user 706 via a cellular network (e.g., via a data link of the cellular network). The second rim device 712 is configured to transmit that data within the on-demand computing network via the hub device 708 and possibly other devices internal to the network (e.g., one or more non-cellular proxy server relays) to the first rim device 710. In the example of FIG. 7, the first hub device 710 is configured to relay data from the second hub device 712 (e.g., voice from cellular user 706) to the desktop computer user 704 for presentation (e.g., video or audio). The first hub device 710 is also configured to receive data which is relayed to the cellular user 706 via the hub device 708 and the second rim device 712. In another configuration, communications at 710 can be with a second cellular user instead of the depicted desktop computer user 704.

Figure 8:
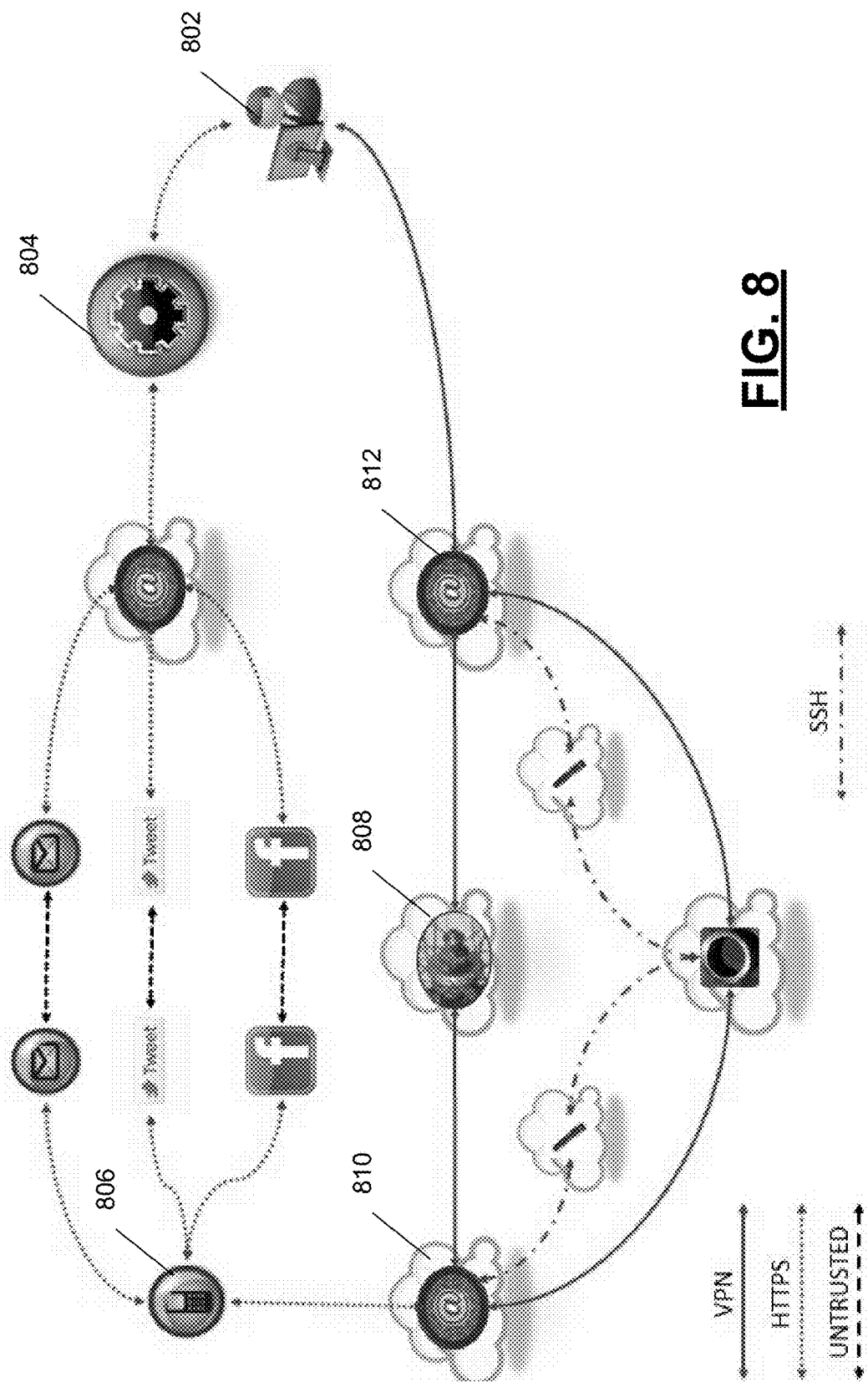
FIG. 8 is a diagram depicting another on-demand computing network environment.

FIG. 8 is a diagram depicting another on-demand computing network environment. A user 802 interacts with a network configuration engine 804 to implement a desired on-demand computing network and to provide a cellular user 806 with sufficient data to connect to the network in a secure manner. The on-demand computing network includes a hub device 808. A first rim 810 device is configured for communication via a cellular network, such as via an Andriod, iOS, or Windows Mobile protocol. A second hub device 812 is configured to communicate externally via a second data portal, such as with user 802. The on-demand computing network includes a third hub device 814, which connects the first and second network devices via a plurality of joints and associated joint relay servers, enabling direct communication between the first rim device 810 and the second rim device 812 without communication through the hub device 808.

In addition to provisioning resources (e.g., 808, 810, 812) for the on-demand computing network, the network implementation engine also provisions resources for communicating connection information to the cellular user 806. A provisioned anonymous e-mail address is used to communicate a connection address to an e-mail address of the cellular user. A provisioned anonymous twitter account is used to communicate a first portion of authentication data (e.g., a password) to the cellular user 806. A provisioned anonymous Facebook account is used to communicate a second portion of the authentication data to the cellular user 806. Upon receipt of the three connection data pieces, the cellular user 806 can successfully establish a connection to the first rim device 810 and communication with the user 802 can begin. The network implementation engine 804 can then de-provision the resources utilized to transmit the connection information to the cellular user 806.

Figure 9:
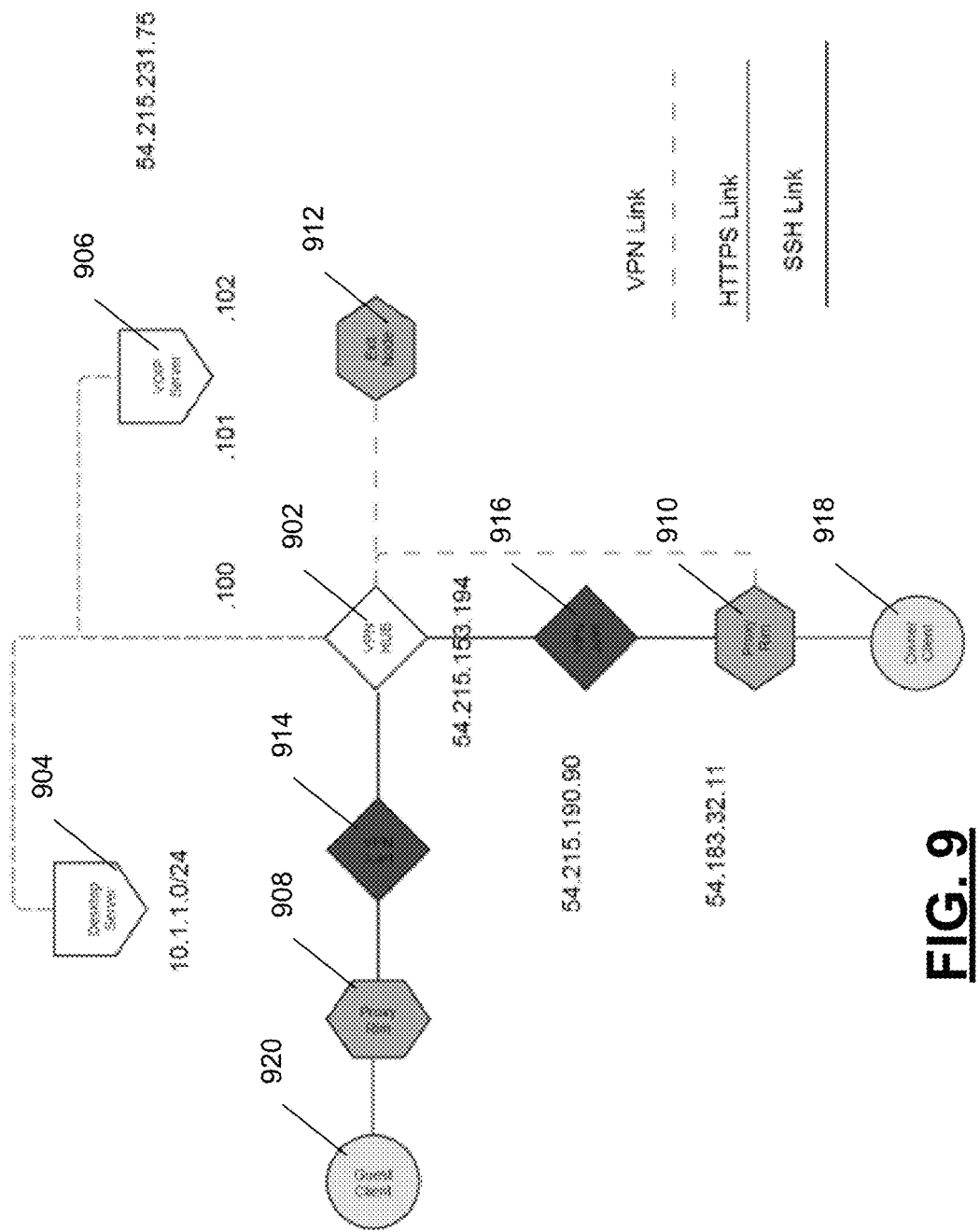
FIG. 9 is a diagram depicting an example on-demand network topology.

FIG. 9 is a diagram depicting an example on-demand network topology. A VPN hub 902 communicates with a desktop server rim device 904, a voice over IP (VOIP) server 906, two proxy server rim devices 908, 910, and an exit node rim device 912. The spokes to proxy server rim devices 908, 910 include joint relay devices 914, 916 that communicate via an SSH protocol. A network owner 918 communicates with the network via rim device 910, while a guest user 920 communicates with the network via rim device 908. These communications are via Https protocol links. The VOIP server 906 enables communications to and from the network via one or more external cellular networks.

Figure 10:
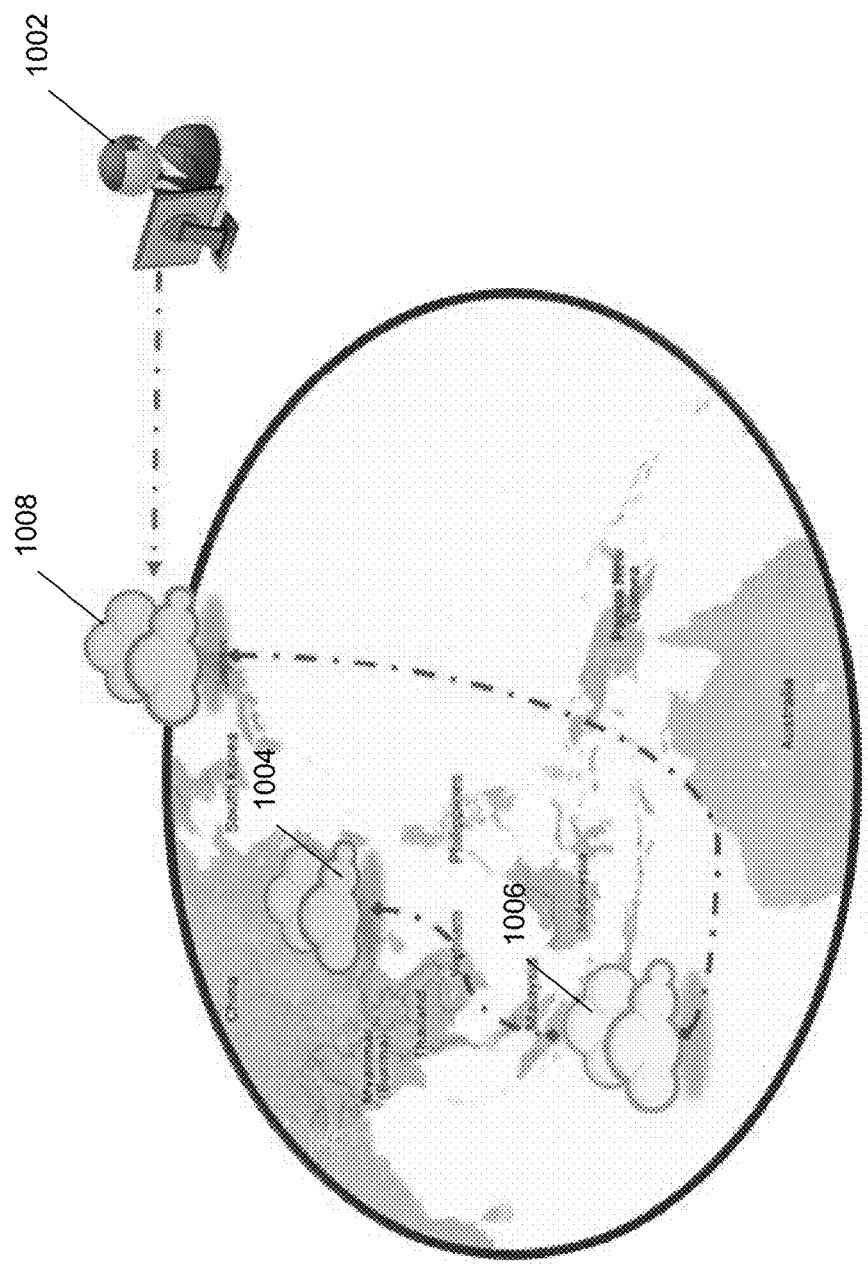
FIG. 10 is a diagram depicting a first example use case for a system for implementing an on-demand computing network environment.

FIG. 10 is a diagram depicting a first example use case for a system for implementing an on-demand computing network environment. In the example of FIG. 10, a user 1002 wishes to appear to be browsing websites from within China. The user 1002 requests a network topology that includes a squid proxy server 1004 provided by a third party compute service provider (e.g., cloud provider, software as a service provider, platform as a service provider, infrastructure as a service provider) inside China. The user 1002 does not wish it to be known that the squid proxy server 1004 is being accessed from the United States. Thus, the user 1002 requests that a hub device 1006 be deployed in Rackspace in Malaysia. Communications within the on-demand network run through the hub device 1006 in Malaysia. A second rim device 1008 in Japan is provisioned for the on-demand network. The user 1002 communicates with the Japan rim device 1008, through the hub device in Malaysia 1006 and the proxy server 1004 in China to the outside of the network. The user's communications will have no trace of having originated in the United States, instead appearing to originate from the proxy server exit rim device 1004 in China.

Figure 11:
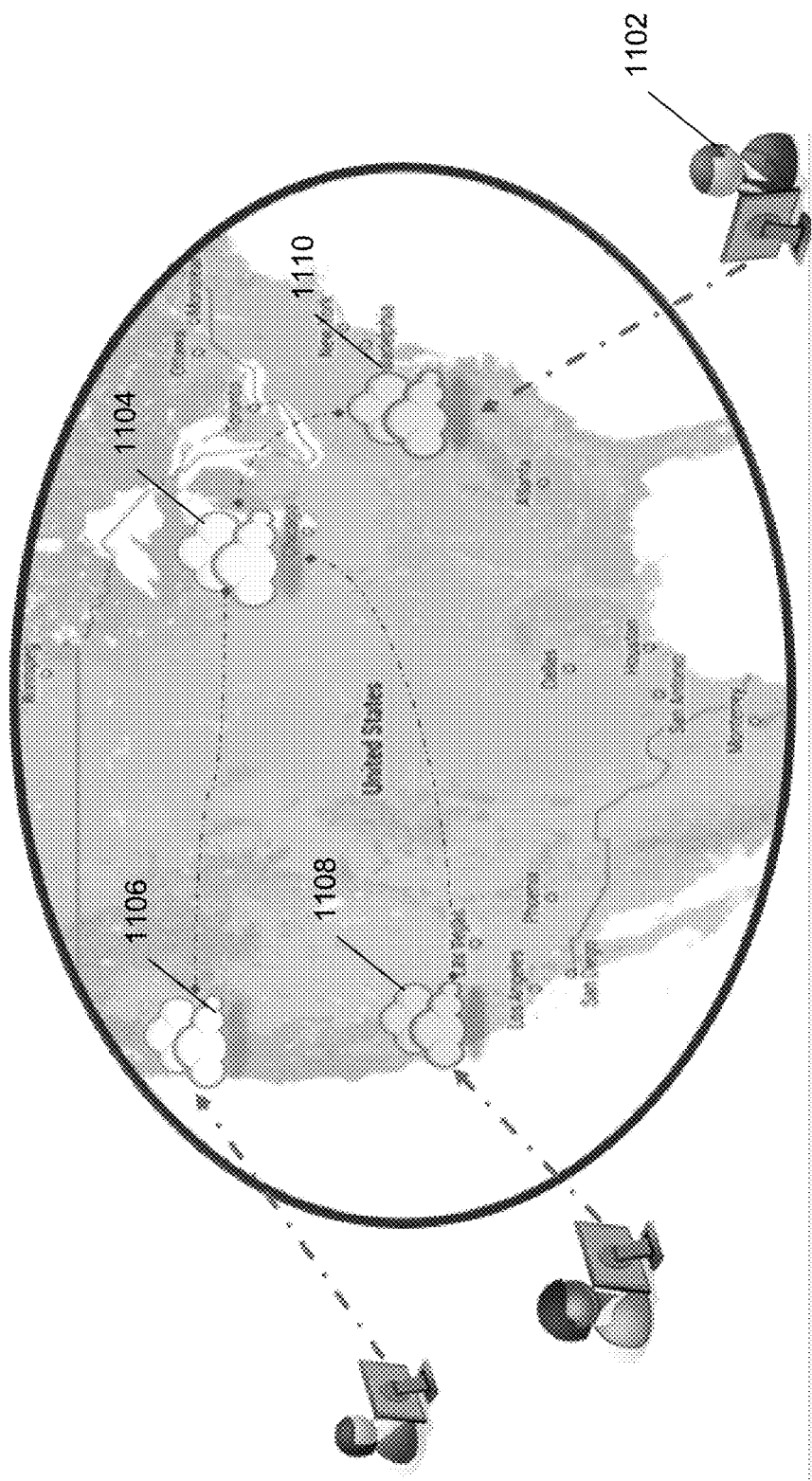
FIG. 11 is a diagram depicting a second example use case for a system for implementing an on-demand computing network environment.

FIG. 11 is a diagram depicting a second example use case for a system for implementing an on-demand computing network environment. In the example of FIG. 11, three parties wish to have an anonymous conference call. One user 1102 directs provisioning of a PBX and hub device in a Rackspace data center 1104 in Chicago. The user 1102 requests creation of three rim devices with external communication capabilities, one in Washington 1106, one in California 1108, and one in Virginia 1110. Access information is provided to the other participants that is specific to their assigned rim device 1106, 1108 where that access information is used for connection to and initiation of the conference call.

Figure 12:
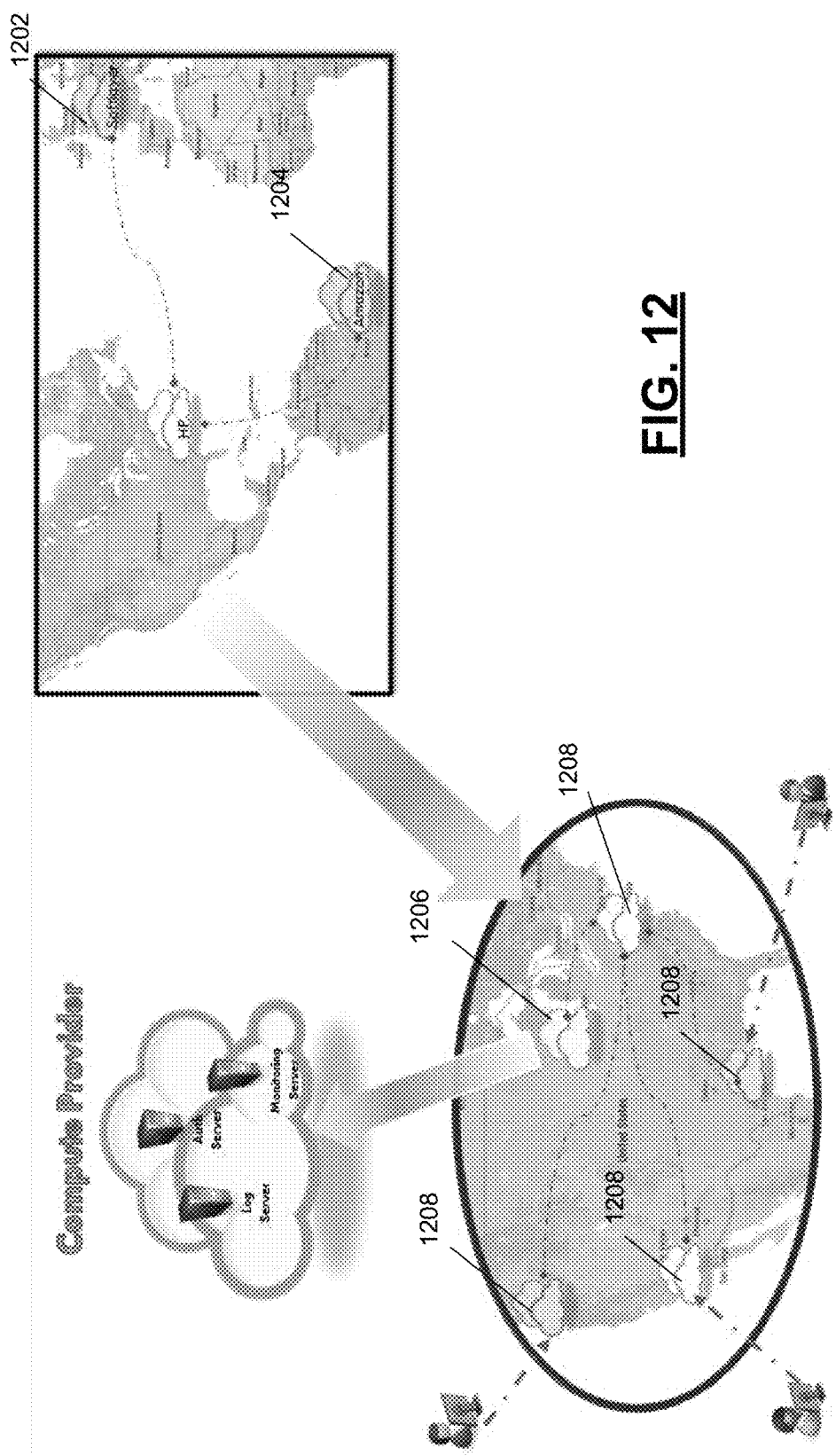
FIG. 12 is a diagram depicting a third example use case for a system for implementing an on-demand computing network environment.

FIG. 12 is a diagram depicting a third example use case for a system for implementing an on-demand computing network environment. An organization desires to provide third party compute service provider based, disposable Desktops for their employees, with exit point rim devices in Europe 1202 and Brazil 1204. Management feels that it is important to monitor the activity of the employees, save system log files for their reports, and provide a means of giving access to deployed resources to external clients. An administrator decides to set up an Auth Server, Log Server, and Monitoring Server in Rackspace at 1206 and connect those resources to a hub server in New Jersey 1208. The administrator then deploys exit points rim devices in Brazil 1204 and Amsterdam 1202.

Any desktop servers 1208 being built in this project will be able to use exit points in Brazil 1204 or Europe 1206, and have their logs sent to the Chicago 1206 rim device. Access to the desktops will be provided by an in project authentication server, and all deployed resources, from the hub to the exit points will be monitored by the monitoring server deployed in Chicago 1206.

Figure 13:
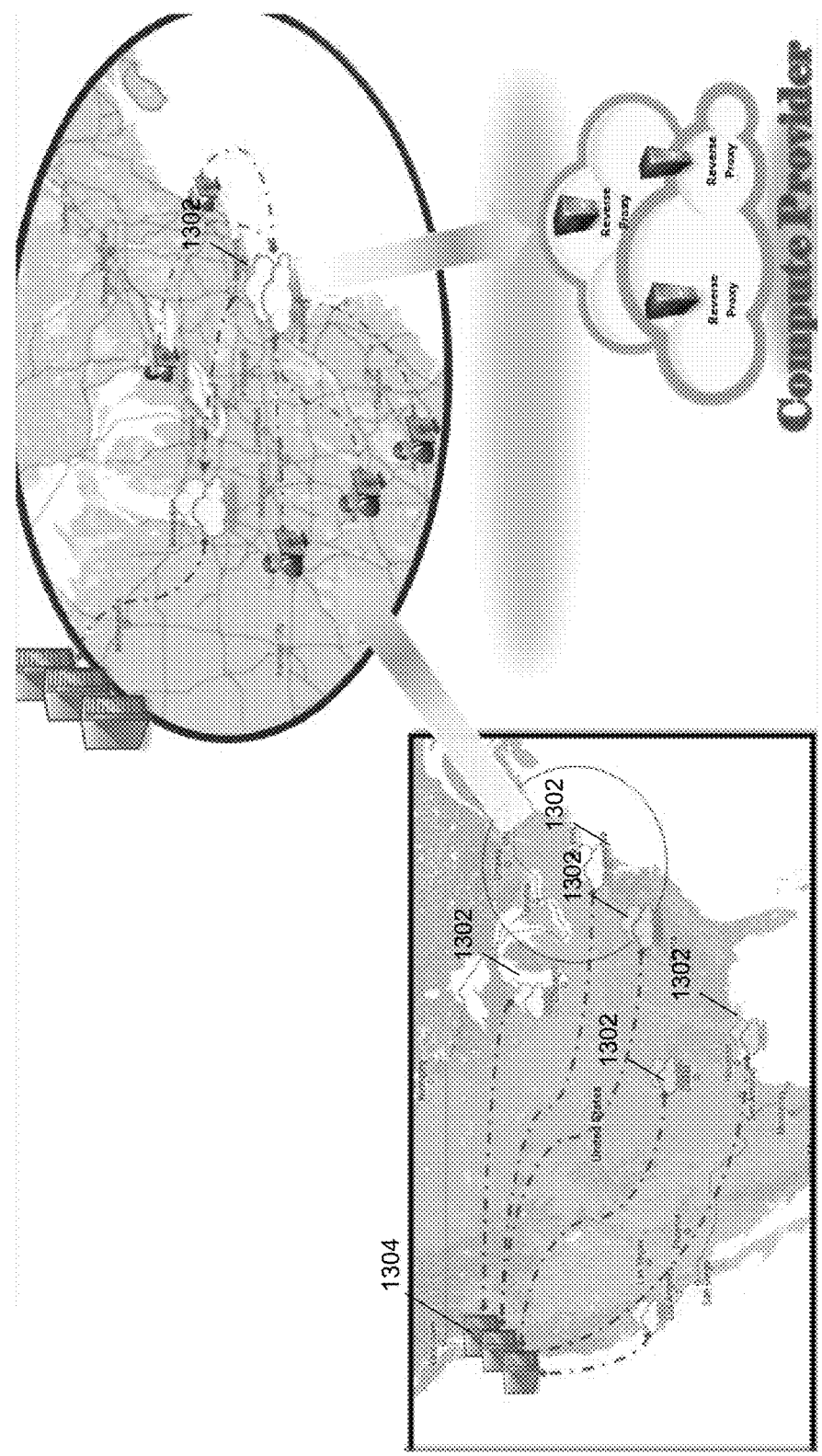
FIG. 13 is a diagram depicting a fourth example use case for a system for implementing an on-demand computing network environment.

FIG. 13 is a diagram depicting a fourth example use case for a system for implementing an on-demand computing network environment. A software as a service (SaaS) provider selling streaming media is concerned that Internet service providers (ISPs) are doing destination bandwidth throttling. The SaaS utilizes a network implementation engine to deploy regional pools of proxy servers 1302 to masquerade their traffic destination, while preserving network performance by making the proxies local to their user base. The regional proxy server pools 1302 prevent the ISPs from ascertaining that data is coming from the SaaS servers 1304, the data instead appearing to originate from the proxy server pool 1302 to which a user is connected. Such an implementation could be useful for prevention of throttling of streaming media, such as streaming video content.

In one example, a service at 1304 communicates with user clients, indicating a set of proxy servers 1302 with which to communicate. A pool of proxy servers 1302 receive client stream requests and pass the requests back to the server 1304. The pool of proxy servers can be cycled aggressively with minimal service disruption. The proxy servers 1302 present the requests to the server 1304, with streamed data being provided to the users through the proxy servers 1302. An ISP is unable to ascertain an original source of the streaming data as being the server 1304 instead of the pool of proxy servers 1302.

In a second example, a network implementation engine provisions dynamic proxy servers in various clouds, connects those servers to fixed brokers, and publishes the list to the server 1304. The portal server, over SSL, directs clients to retrieve data from the dynamic proxy servers located in the various clouds. The dynamic proxy servers receive client stream requests and pass them to fixed broker servers known only by service server 1304. The fixed brokers pass traffic requests back to the data cache. The brokers act as a fixed point for minimal disruption to streaming operations.

Figure 14:
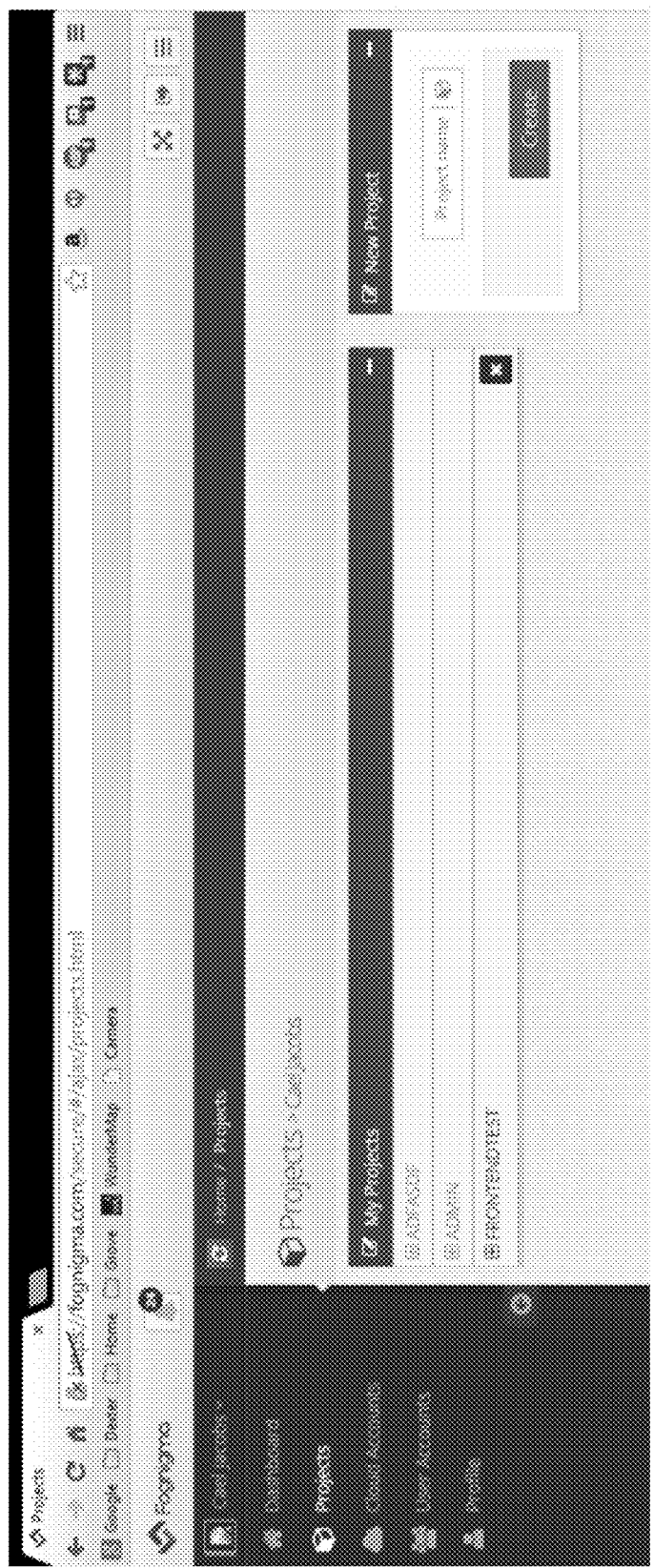
FIG. 14 is a user interface for selecting a project with which to interact.
Figure 15:
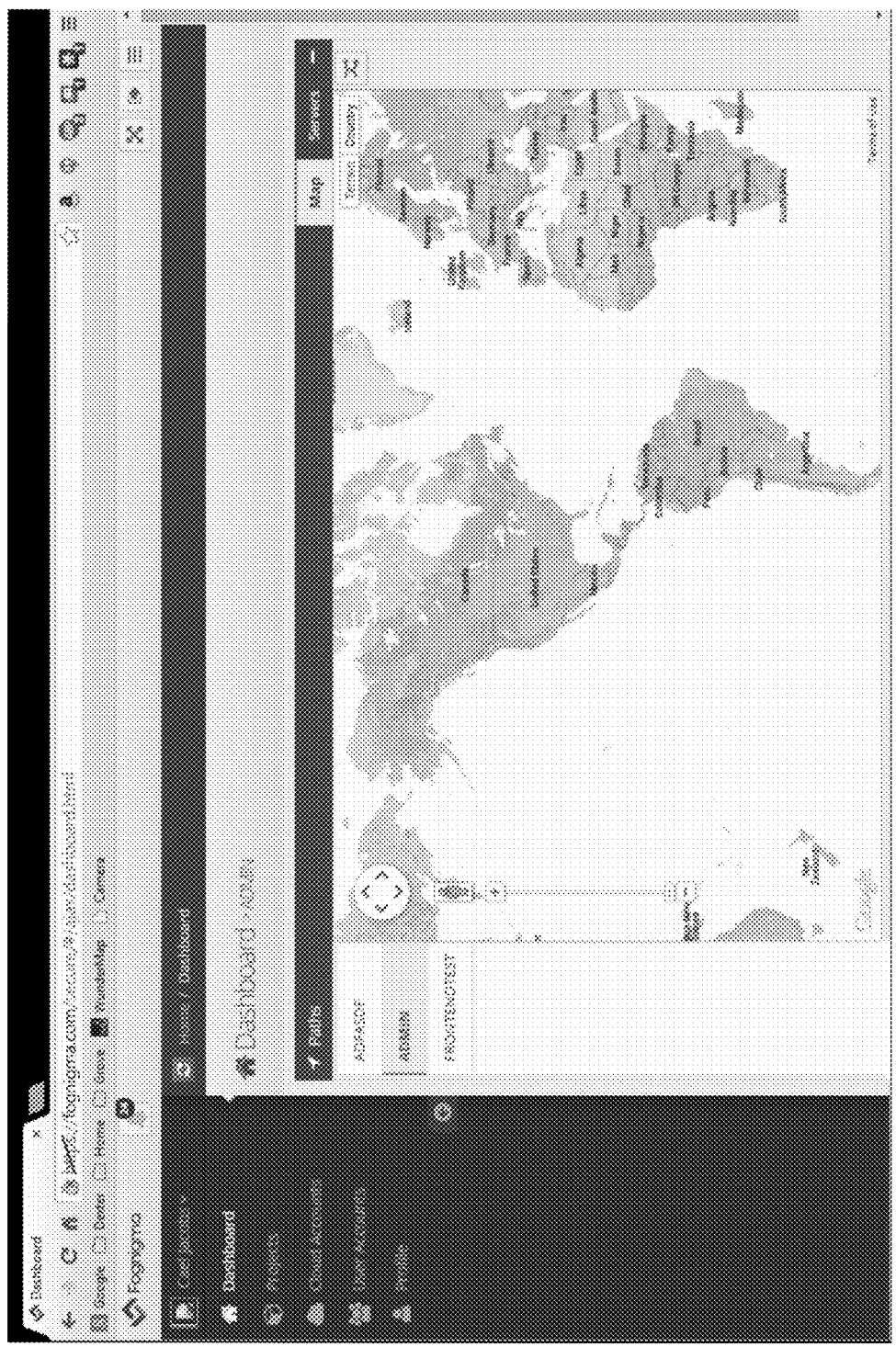
FIG. 15 is a diagram depicting provisioned computing resources within the on-demand computing network.
Figure 16:
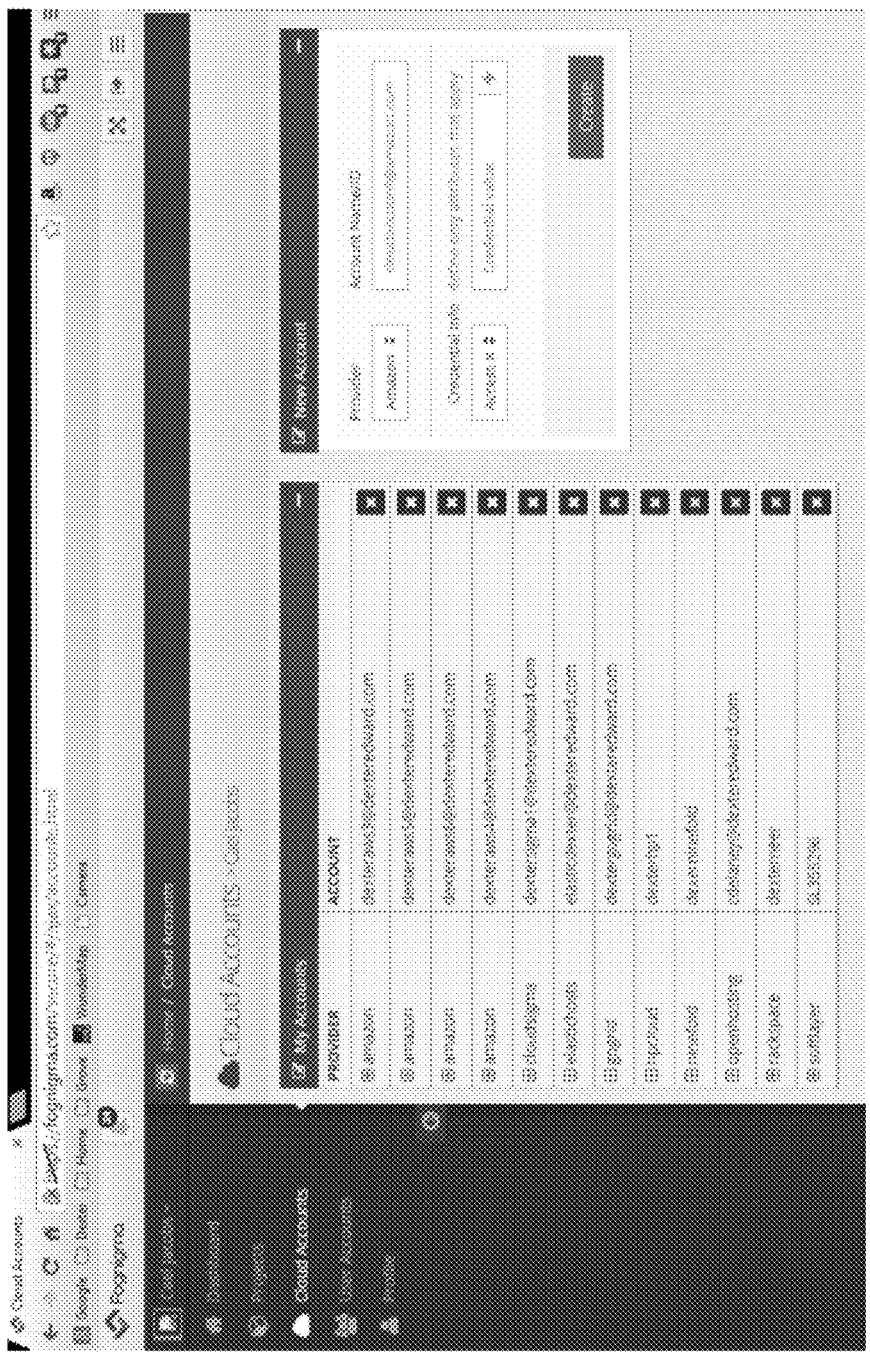
FIG. 16 is a diagram depicting resources available in a pool of acquired resources.
Figure 17:
FIG. 17 is a diagram depicting resources deployed into an on-demand computing network, including physical locations of those deployed resources.

FIG. 14 is a user interface for selecting a project with which to interact. Each depicted project is associated with an on-demand computing network that has been deployed or is being designed. FIG. 15 is a diagram depicting provisioned computing resources within the on-demand computing network. No resources have been deployed yet in the example of FIG. 15. FIG. 16 is a diagram depicting resources available in a pool of acquired resources. The depicted resources can be selected for deployment into an on-demand computing network. FIG. 17 is a diagram depicting resources deployed into an on-demand computing network, including physical locations of those deployed resources.

Examples have been used to describe the invention herein, and the scope of the invention may include other examples. For example, an on-demand computing network environment could be implemented without any hubs or joints in a wheel, such as a single rim-to-rim network or a one-rim-to-many-rims network, or a many-rims-to-many-rims network. As a further example, an on-demand computing network environment could include one or more of a first rim device connected to a second rim device via one or more joints; multiple joints connected without inclusion of a hub device; a one-to-many joint connection; and a many-to-many joint connection.

It is claimed:

1. A computer-implemented method of implementing an on-demand computing network environment, comprising:
   providing a user interface that presents available computing resources and physical locations of those computing resources, wherein a first type of computing resource is available from multiple physical locations;
   receiving a network specification from a user via the user interface, wherein the network specification includes a plurality of resources and selected physical locations for each of the plurality of resources;
   provisioning the plurality of resources from one or more resource providers;
   configuring the on-demand computing network, wherein configuring comprises:
      assigning a first provisioned resource as a hub device;
      assigning one or more second provisioned resources as rim devices, wherein a particular rim device comprises a bridge device, wherein the bridge device repackages data received from the on-demand computing network prior to forwarding that data such that the data received from the on-demand computing network appears to terminate at the bridge device to an observer viewing the data between the hub device and the bridge device.

2. The method of claim 1, wherein a particular rim device is designated as an exit point, wherein the on-demand computing network transmits traffic out of the on-demand computing network only through the particular exit point rim device or another rim device identified as an exit point.

3. The method of claim 2, where two or more rim devices are identified as exit points, wherein a service broker module at the hub device is configured to receive a user command to designate one of the exit point rim devices from which to transmit traffic from the on-demand computing network.

4. The method of claim 3, wherein the service broker is configured to direct traffic transmission from a different exit point rim device upon receipt of a user command.

5. The method of claim 4, wherein the user interface is configured to:
   identify one or more types of traffic and identifications of the exit point rim devices;
   upon user selection of a traffic type and a specific exit point rim device, direct traffic of the selected traffic type from the on-demand computing network via the specific exit point rim device.

6. The method of claim 5, further comprising:
   upon user selection of the traffic type and a second specific exit point hub device, directing traffic of the selected traffic type from the on-demand computing network via the second specific exit point rim device.

7. The method of claim 6, wherein the user is connected to the hub device via a VPN connection, wherein the second specific exit point is selected in favor of the specific exit point for transmission of traffic without requiring the user to reconnect to the VPN connection.

8. The method of claim 1, wherein configuring further comprising:
   assigning a plurality of joints between a particular rim device and the hub device via one or more joint relay provisioned resources, wherein the hub device is unaware of a physical address of the particular rim device and the particular rim device is unaware of a physical address of the hub device.

9. The method of claim 8, wherein the joint relay provisioned resources communicate via an SSH protocol, wherein the hub device and the particular rim device communicate with one another via the joint relay provisioned resources via VPN.

10. The method of claim 1, wherein a first rim device is configured to send and receive data via a cellular network, wherein the first rim device is configured to transmit data within the on-demand computing network via the hub device and one or more non-cellular proxy server relays to a second rim device, wherein the second rim device is configured to send and receive data via a second cellular network.

11. The method of claim 10, wherein an address for communicating with the first rim device is provided to a first user, wherein an address for communicating with the second rim device is provided to a second user, wherein the first rim device is unaware of a physical address of the second rim device and the second rim device is unaware of a physical address of the first rim device.

12. The method of claim 10, wherein the first rim device is configured to communicate with a cellular phone via an Andriod, iOS, or Windows Mobile protocol.

13. The method of claim 1, wherein at least one rim device is a non-exit point, wherein the non-exit point rim device provides a computing service.

14. The method of claim 13, wherein the computing service is a file server service or a mail server service.

15. The method of claim 1, wherein the resources are provisioned from a plurality of disparate service providers.

16. The method of claim 1, wherein the resources include an email account, a social media account, and a third party compute service provider processing resource.

17. The method of claim 1, wherein the on-demand computing network includes a single hub device.

18. The method of claim 1, wherein the configuring is performed using an external engine, wherein resources can be added and removed from the on-demand network only using the engine.

19. The method of claim 18, further comprising:
   de-provisioning a provisioned resource assigned to the on-demand computing network using the engine, wherein the engine does not communicate with the provisioned resource being de-provisioned.

20. The method of claim 18, wherein the engine does not communicate with the on-demand computing network when the on-demand computing network is in an active state.

21. The method of claim 1, wherein the hub device and a particular rim device are located at different locations in disparate legal jurisdictions.

22. The method of claim 21, wherein the particular rim device is located in a different country than the hub device.

23. The method of claim 1, wherein a first rim device is configured to communicate with a user, wherein a second rim device is configured to communicate with a service that is external to the on-demand network, wherein the first rim device communicates with the second rim device via the hub device, wherein the first rim device is located in a different country than the second rim device, wherein the external service is unable to discern that commands transmitted from the second rim device via the hub and the first rim device are coming from a different country than the country of the second rim device.

24. The method of claim 1, wherein a first rim device anonymizes a source of data that is provided from the network to a client via the first rim device, wherein that data is received by the on-demand computing network at a second rim device.

25. The method of claim 1, wherein an external computing device that communications with a first rim device comprises a memory, a processor, and a network interface.

26. A computer-implemented system for implementing an on-demand computing network environment, comprising:

a provisioned resource data store configured to store records associated with resources provisioned from one or more resource providers, wherein records in the provisioned resources data store include an identification of a particular resource and a particular on-demand computing network to which the particular resource has been assigned;

a network implementation engine configured to:
provide a user interface that presents available computing resources and physical locations of those computing resources, wherein a first type of computing resource is available from multiple physical locations;

receive a network specification from a user via the user interface, wherein the network specification includes a plurality of resources and selected physical locations for each of the plurality of resources;

assign a first provisioned resource as a hub device to the particular on-demand computing network and to update the provisioned resource data store; and assign one or more second provisioned resources as rim devices, wherein a particular rim device comprises a bridge device, wherein the bridge device repackages data received from the on-demand computing network prior to forwarding that data such that the data received from the on-demand computing network appears to terminate at the bridge device to an observer viewing the data between the hub device and the bridge device.

\* \* \* \* \*